(12) United States Patent
Giroti

(10) Patent No.: US 8,468,272 B2
(45) Date of Patent: Jun. 18, 2013

(54) ENTERPRISE SMART GRID AND DEMAND MANAGEMENT PLATFORM AND METHODS FOR APPLICATION DEVELOPMENT AND MANAGEMENT

(75) Inventor: Sudhir K. Giroti, Wellesley, MA (US)

(73) Assignee: BRIDGE Energy Group, Inc., Marlborough, MA (US)

( * ) Notice: Subject to any disclaimer, the term of this patent is extended or adjusted under 35 U.S.C. 154(b) by 534 days.

(21) Appl. No.: 12/831,371

(22) Filed: Jul. 7, 2010

(65) Prior Publication Data

US 2011/0010016 A1 Jan. 13, 2011

Related U.S. Application Data

(60) Provisional application No. 61/223,544, filed on Jul. 7, 2009.

(51) Int. Cl.
*G06F 15/16* (2006.01)
*G06F 3/00* (2006.01)
*G05D 3/12* (2006.01)

(52) U.S. Cl.
USPC ............ 709/249; 700/286; 700/291; 719/328

(58) Field of Classification Search
USPC .................... 709/249; 700/286, 291; 719/328
See application file for complete search history.

(56) References Cited

U.S. PATENT DOCUMENTS

| 2004/0167677 | A1 | 8/2004 | Weiss |
| 2009/0077397 | A1 | 3/2009 | Shnekendorf et al. |
| 2009/0088907 | A1* | 4/2009 | Lewis et al. .................. 700/286 |
| 2010/0076615 | A1* | 3/2010 | Daniel et al. .................. 700/293 |

OTHER PUBLICATIONS

Cleveland F., "Utility Standards Board (USB): Utilities Develop Business Requirements for Interoperable Smart Grid Standards," Grid-InterOp Ensuring Grid Interoperability Proceedings, Nov. 11-13, 2008, Atlanta [retrieved Aug. 14, 2010] Retrieved from the Internet. <URL:http://gridwiseac.org/pdfs/grid_interop_08_proceedings.pdf> Entire document, especially: p. C-109, Abstract; p. C-110, Fig. 1; p. C-111, Fig. 2; p. C-112, Fig 3; p. C-114, col. 1, para 4 and Fig. 5.

\* cited by examiner

*Primary Examiner* — Wing F Chan
*Assistant Examiner* — David X Yi
(74) *Attorney, Agent, or Firm* — Sampson & Associates, P.C.

(57) ABSTRACT

A computer-implemented platform server and method is provided for energy management operations in a Smart Grid environment. The platform server includes an application module configured to operate any of a plurality of Smart Grid Applications. A consumer-side module is configured for bi-directional communication with a plurality of consumer-side intelligent appliances. An Operations Technology (OT) module is configured for communication with an electrical grid Energy Management System (EMS). A translation module is coupled to, and configured to translate data received from, the application, consumer-side, and OT modules, so that the platform is configured to selectively receive, translate, and transmit data from and among any of said application, consumer-side, and OT modules, to facilitate automated energy management operations in a Smart Grid environment.

28 Claims, 6 Drawing Sheets

ENTERPRISE SMART GRID AND DEMAND MANAGEMENT PLATFORM AND METHODS FOR APPLICATION DEVELOPMENT AND MANAGEMENT

RELATED APPLICATION

This application claims the benefit of U.S. Provisional Application Ser. No. 61/223,544, entitled Enterprise Smart Grid and Demand Management Platform with Ready Applications and Development Kit, filed on Jul. 7, 2009, the contents of which are incorporated herein by reference in their entirety for all purposes.

BACKGROUND

1. Technical Field

This invention relates to the Smart Grid, and more particularly to a platform configured to manage and integrate various heretofore disparate operations associated with conventional power grid operations, to provide intelligent, various new capabilities.

2. Background Information

There is currently a lack of systems and methods capable of facilitating the systematized management of Demand Response and Smart Grid Programs and Applications, and to integrate them with their organizational Information Technology (IT) systems. There is also a lack of Enterprise Architecture that can be leveraged by Energy clients as reference architecture to achieve their Smart Grid objectives. Still further, there lacks a platform which enables convenient development and deployment of SOA (Service Oriented Architecture) type applications for Smart Grid applications.

Up to now, within an energy company, integration of energy grid applications has generally been an afterthought and primarily driven by whatever technology a particular application vendor offered. Energy companies tended to implement their project-focused integration objectives using one-off approaches in which an application was integrated with another application through a point to point and often proprietary approach. This point to point and organic growth over the years has generally resulted in an "Accidental Architecture" that provides little interoperability, little scalability, and often an interdependence which requires an all-or-none approach to application upgrades. Moreover, application data tends to be locked in silos and cannot be shared or integrated easily. Furthermore, although a market for energy trading exists, the so called energy value-chain which refers to the various energy industry participants and stakeholders, is not connected through any unified, automated technology, making it difficult for the fluctuation in energy prices to be leveraged for the benefit of the consumer and for more efficient delivery of power to consumers. Without an integrated market, the consumer typically ends up paying a pre-defined rate—generally higher than the optimal rate, thereby denying the consumer complete benefits of the energy market which can typically result in lower prices, variable prices, discounts and more value that equates to transparency to the energy market and greater grid reliability. With less competition in the energy market, grid reliability also suffers. Additionally, unlike the electrical grid that is highly integrated from generation to the consumer, the information technology and systems of various energy industry participants who are responsible for the energy generation, transmission, distribution and market operation are generally not integrated or at least communicating in a manner that would enable the implementation of Smart Grid services such as automated self healing of the grid, leveraging of price and market signals from the market, increasing grid reliability, consumer empowerment and others.

Thus, a need exists for a system and method capable of addressing one or more of the foregoing drawbacks.

SUMMARY

In one aspect of the present invention, a computer-implemented platform server is provided for energy management operations in a Smart Grid environment. The platform server includes a server having a processor, memory, and computer readable media. An application module communicably coupled to the server, is configured to operate any of a plurality of Smart Grid Applications. A consumer-side module is communicably coupled to the server and configured for bi-directional communication with a plurality of consumer-side intelligent appliances. An Operations Technology (OT) module is communicably coupled to the server and configured for communication with an electrical grid Energy Management System (EMS). A translation module is coupled to, and configured to translate data received from, the application, consumer-side, and OT modules, so that the platform is configured to selectively receive, translate, and transmit data from and among any of said application, consumer-side, and OT modules, to facilitate automated energy management operations in a Smart Grid environment.

In another aspect of the invention, a computer-implemented method for energy management operations in a Smart Grid environment, includes using the OT and Consumer-Side modules of the above-described platform to receive and capture energy data from OT and Consumer side devices substantially in real time. The platform is used to translate the captured data and to actuate the application module to process the captured data. The application module generates a control command based on the processed data, which is translated into a protocol associated with the Consumer-Side module, and transmitted to the Consumer-Side device. A feedback communication from the Consumer-Side device is received at the platform, which is translated and forwarded to the application module for further processing substantially in real time.

In yet another aspect of the invention, an article of manufacture for energy management operations in a Smart Grid environment includes a computer usable medium having a computer readable program code embodied therein for implementing the above-described method.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
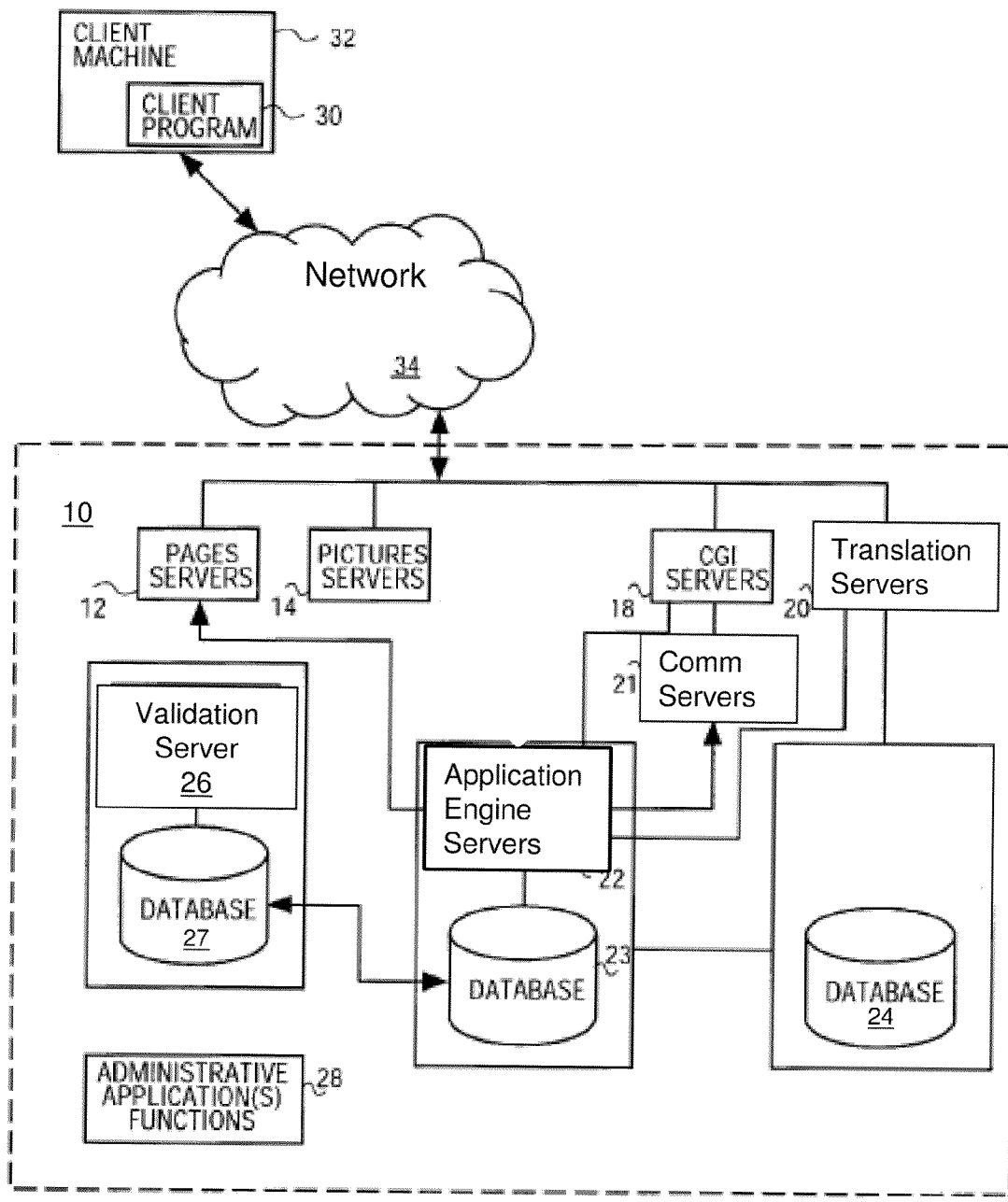
FIG. 1 is a block diagram of one embodiment of the present invention, including an exemplary Smart Grid Platform.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

A method and apparatus for providing automated Smart Grid service development and operation management are described. Embodiments of the invention provide for (a) Integration of energy specific applications and other systems within an energy organization such as companies that generate power, transmission companies that transmit power, distribution companies that distribute power and other similar organizations, such as those in the business of providing, delivering and/or distributing other utilities such as water or gas; (b) Interoperability amongst these utility organizations across multiple domains, such as the Generation domain, Transmission domain, Distribution domain, Market domain, Operations domain, Service Provider domain and Customer domain and (c) End-to-end integration and interoperability amongst participants within the foregoing domains, e.g., within the Power and Utility industry, to provide a real time, transactional environment to integrate the entire energy value chain. Such integration and interoperability amongst participants provides for inter-domain and intra enterprise-level integration of applications and islands of data to improve information flow throughout the enterprise and amongst participants in a secure manner. These embodiments provide for effectively leveraging existing functionalities from numerous distribution, transmission, asset management and other enterprise systems, such as advanced metering infrastructures, meter data management systems, customer information systems, billing systems, outage management systems, geographic information systems, work management systems, energy and distribution automation management systems, SCADA, mobile workforce systems, supply chain management systems and other enterprise applications.

Particular embodiments provide real-time integration to provide (a) a unified and consistent view of information and data throughout the organization, to facilitate the development of new processes and capabilities such as load curtailment, self-healing, fault location detection and restoration, remote connect and disconnect, advance billing, time of usage and variable rate billing and other demand management programs, (b) capability to optimally manage the supply and demand of power through real time integration of the energy value chain from the generation to consumer for, e.g., higher grid reliability and (c) leverage real time integration of the aforementioned domains, participants and their applications, systems and data to harness market and price signals and integrate them with available real time data for delivering more value to consumers, such as in terms of variable rates, lower prices and greater reliability of electricity, water and gas. In the following description, for purposes of explanation, numerous specific details are set forth in order to provide a thorough understanding of the present invention. It will be evident, however, to one skilled in the art that the present invention may be practiced without these specific details.

Terminology

Where used in this disclosure, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs. Terms such as "component," "module", and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices. The term "transaction" or "transactional" shall be taken to include any communications between two or more entities and shall be construed to include, but not be limited to, industrial or commercial transactions including data transfers for general informational, closed-loop control, and sale and purchase transaction purposes, and the like.

Programming Languages

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to the Figures, embodiments of the present invention will be more thoroughly described. Embodiments of the present invention include an Enterprise Smart Grid platform (e.g., platform integration server) that may be deployed by substantially any of various participants in the energy chain, including quasi-governmental entities such as ISOs (Independent System Operators) or RTOs (Regional Transmission Operators), and Utilities including power generation and power delivery organizations, (including substantially any entities within the aforementioned Generation, Transmission, Distribution, Market, Operations, Service Provider, and/or Customer domains) to achieve Smart Grid objectives such as load curtailment, efficient operations management, and real-time energy market response, etc. This platform is flexible and scalable, to provide the foundation for launching Smart Grid applications that may be both currently available and developed in the future. As will be described in greater detail hereinbelow, various alternate embodiments of the Smart Grid Platform of the present invention are configured to enable Utility clients to integrate AMI/AMR (Advanced Metering Infrastructure/Automated Meter Reading) Smart Meter data with other enterprise applications including industrial control systems such as EMS (Energy Management Systems), SCADA (Supervisory Control and Data Acquisition), CIS (Customer Information System), GIS (Geographic Information System) and others, while optionally conforming to NERC CIP (North American Reliability Corp. Critical Infrastructure Protection) security standards and requirements. This integrated data may then be used in real time to effect operations such as managing consumer demand and providing load curtailment capability down to the Smart Meter level. Smart Meters may thus be used to curtail load based upon real time load and on each customer's actual energy use. These embodiments may be similarly used for remote connects/disconnects to achieve on-demand load reductions, etc.

Once deployed, the platform may also enable various other demand management programs to be launched by utilities and/or other users. Some of these programs, such as identified by NERC, may include non-dispatchable DR (Demand Response) programs such as Time of Use, Critical Peak Pricing, Real Time Pricing, etc., and dispatchable DR programs such as Critical Peak Pricing with Control, Energy-Price, Demand Bidding and Buyback. Utilities may also deliver customer dashboards, e.g., in the form of web pages and the like, that may be used to monitor current usage. Customers may be conveyed clear price signals that they may use to decide whether they want to continue to use electricity or curtail their usage during peak hours. A market driven approach may promote efficiencies in the energy usage, improve demand management and increase grid reliability.

Turning now to FIG. 1 in particular, a block diagram is shown, which illustrates an exemplary network-based transaction facility which may form the basis of a Smart Grid Platform 10 of the present invention. This Smart Grid Platform 10 includes one or more of a number of types of front-end servers, such as a page server 12 that delivers pages (e.g., markup language reports), and a picture server 14 that together may dynamically deliver text and graphical information to be displayed within a Graphical User Interface (e.g., Web pages and the like) to users on client machines 32 communicably coupled via a network 34 to platform 10. As also shown, platform 10 may also include one or more CGI (Common Gateway Interface) servers 18 that provide an intelligent interface to the back-end of facility 10, and a translation server 20, which may maintain and facilitate access to a translation database 24 to handle translations of between the various protocols associated with communications to the facility 10 from the various users (parties/modules) of platform 10, as discussed in greater detail hereinbelow. A communication server 21 provides, inter alia, automated handling (e.g., receipt and generation) of communications (e.g., email and/or other protocols associated with particular applications/users) to users of the facility 10. The back-end servers may include an application engine server 22, e.g., to run various applications containing business logic, etc., and a validation server 26, e.g., to enforce permissions for the various users, each of which may maintain and facilitate access to a database or other information storage device, shown respectively as 23 and 27. Facility 10 may also include an administrative application server 28 configured to provide various administrative functions.

As mentioned above, the network-based Smart Grid Platform 10 may be accessed by a client program 30, such as a browser (e.g., the Internet Explorer distributed by Microsoft) that executes on a client machine 32 and accesses the facility 10 via a network 34 such as, for example, the Internet. Other examples of networks that a client may utilize to access the Smart Grid Platform 10 include a wide area network (WAN), a local area network (LAN), a wireless network (e.g., a cellular network), or the Plain Old Telephone Service (POTS) network. It should be recognized that client programs/machines 30/32, may be substantially any intelligent device or system, ranging, for example, from handheld computers/PDAs to industrial control systems (e.g., SCADA) and intelligent electric power meters, etc., with or without their own user interfaces, as will be discussed in greater detail hereinbelow.

Figure 2:
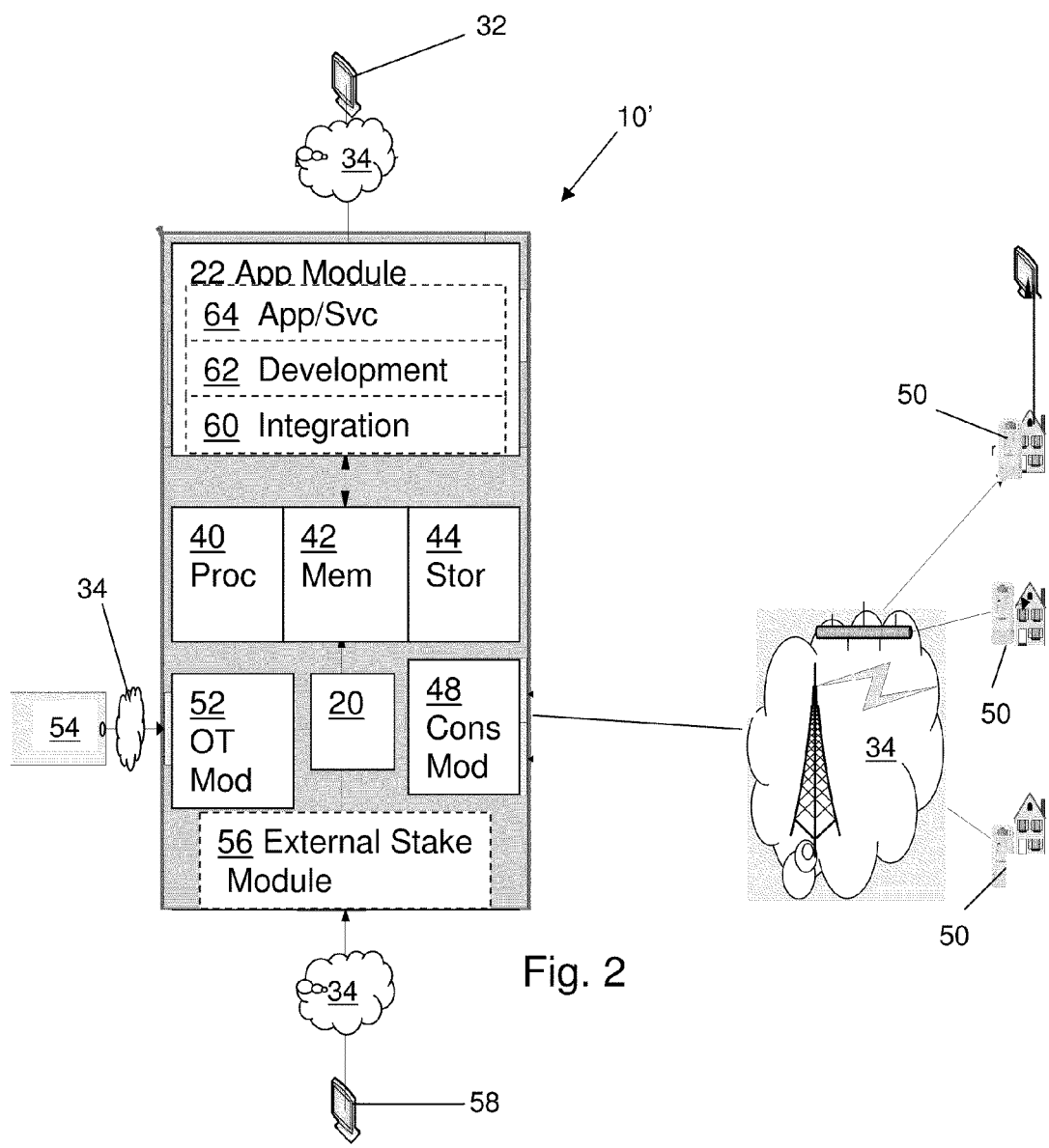
FIG. 2 is a block diagram of another embodiment of the present invention, including another Smart Grid Platform.

Turning now to FIG. 2, a particular exemplary embodiment of the Smart Grid Platform of the present invention is shown at 10'. This platform 10', includes a server having a processor 40, memory 42, and computer readable media such as a database or other storage device 44, such as shown and described with respect to FIG. 1. This server(s) supports an application module 22, which may include at least one Application Programming Interface (API) configured to enable integration with any of a plurality of Smart Grid Applications, as will be described in greater detail hereinbelow. As shown, application module 22 may be communicably coupled, e.g., via network 34, to a client machine 32 which may be used to upload and/or monitor operation of the various applications being executed on platform 10'. Platform 10' also includes a consumer-side module 48 configured for bi-directional communication, e.g., via network 34, with a plurality of consumer-side intelligent devices (e.g., appliances) 50. In a particular non-limiting example, appliances 50 may include smart meters and/or internet-enabled home appliances, etc. Still further, platform 10' includes an Operations Technology (OT) module 52, which is configured for communication, e.g., via network 34, with an industrial process control system 54 such as an electrical grid Energy Management System (EMS). Particular examples of an EMS capable of being communicably coupled to platform 10' via OT module 52, include the aforementioned SCADA systems. Platform 10' also includes a translation module 20 configured to translate data being passed between the application, consumer-side, and OT modules. Platform 10' is thus configured to selectively receive, translate, and transmit data from and among the application, consumer-side, and OT modules 22, 48, 52, to facilitate automated Smart Grid operations, such as may be dictated by the various applications running via application module 22.

In particular embodiments, the translation module 20 is configured to operate using the conventional CIM (Common Information Model) standard.

Optionally, platform 10' may also include an external stakeholder module 56, shown in phantom, which is communicably coupled to the other modules 22, 48 and 52, via translation module 20. Stakeholder module 56 is configured to provide bi-directional communication between platform 10' and one or more Smart Grid Stakeholders 58, which may be located remotely from the platform. Examples of such external stakeholders may include both internal energy supply chain participants such as ISOs, Power Generation entities, Power Transmission entities, and Utility Operators, etc., and external energy supply participants such as those involved in financial aspects of the energy market. It should be recognized that these external stakeholders may be substantially any entity within the aforementioned Generation, Transmission, Distribution, Market, Operations, Service Provider, and/or Customer domains.

Platform 10', including the optional External Stakeholder module 56, may thus provide end-to-end automated integration across substantially the entire energy value chain from power generation to transmission (and ISO) to consumer. In this regard, it should be noted that individual platforms 10', or portions thereof, may be deployed at substantially any point in the energy value chain, to facilitate this end-to-end integration. Such deployment will be discussed in greater detail hereinbelow with respect to FIG. 3A.

It should be noted that in particular embodiments, application module 22 is configured to employ a Service Oriented Architecture (SOA) or other Loosely Coupled Architecture (LCA), such as known to those skilled in the art of platform architecture. By employing such architecture, module 22 enables individual Smart Grid Applications to be conveniently integrated, without being dependent upon one another. Individual applications may thus be conveniently added to, or removed from, the platform 10' without adversely affecting other applications. It should be recognized that this aspect tends to provide platform 10' with robustness and with flexibility which facilitates migration from older applications to new applications on an application-by-application basis as new applications are developed in the future. Examples of Smart Grid Applications that may be usable with platform 10' both currently and in the future may include Outage Management Systems (OMS), Interactive Voice Response (IVR) systems, Customer Information Systems (CIS); Workforce Management Systems (WMS), Grid Self Healing Systems, demand-based connect/disconnect and load curtailment, AMI/AMR (Advanced Metering Infrastructure/Automated Meter Reading), GIS (Geographic Information System) and others as necessary while conforming to security and safety standards such as NERC CIP (North American Reliability Corp. Critical Infrastructure Protection) security standards and requirements, e.g., in real time, based upon real time load on the grid and each customer's actual energy use, such as provided via consumer module 48.

In this regard, application module 22 may be optionally configured with a series of sub-modules in order to optimize the foregoing functionality. For example, application module 22 may be provided with an integration module 60, a development module 62, and an application/services module 64, such as shown in phantom. The integration module 60 may be configured to communicate with the other modules, including the Consumer, OT and External Stakeholder modules 48, 52, and 56. The development module 62 may essentially take the form of a kit or suite of development tools, APIs, etc., to enable developers to conveniently create applications and/or services to run on the platform 10'. The application/service module 64 may be configured to manage and run the various applications, whether or not those applications were developed using development module 62.

With reference to the aforementioned real time capture of customer energy use, the consumer-side module 48 is configured to communicate with intelligent appliances such as smart meters and/or internet-enabled appliances. For example, module 48 may be configured to facilitate communication between a Metering Automation or Meter Data Management System (e.g., running on module 22 or on a remote server, FIG. 3), and a smart meter/appliance 50 located at customer premises. This communication may thus be used to facilitate automated meter reading and/or meter control, e.g., as part of the automation provided by the various embodiments disclosed herein.

It should also recognized that the connectivity and integration provided by platform 10' enables an entity's EMS (e.g., SCADA) system to communicably interact (via OT module 52) with various IT systems (e.g., via application module 22 and/or consumer-side module 48. In this regard, it should be recognized that any one or more of the applications discussed herein as potentially running via application module 22, may alternatively or additionally, run on a separate IT System communicably coupled to module 22 via network 34 as shown.

It should also be recognized that embodiments of platform 10' are platform independent, being operable on various operating systems, including Microsoft, Apple, and Linux systems, etc. Still further, the platform integration server 10' may be deployed on a local user's infrastructure, and/or remotely in a cloud computing or SaaS (Software as a Service) environment.

Figure 3:
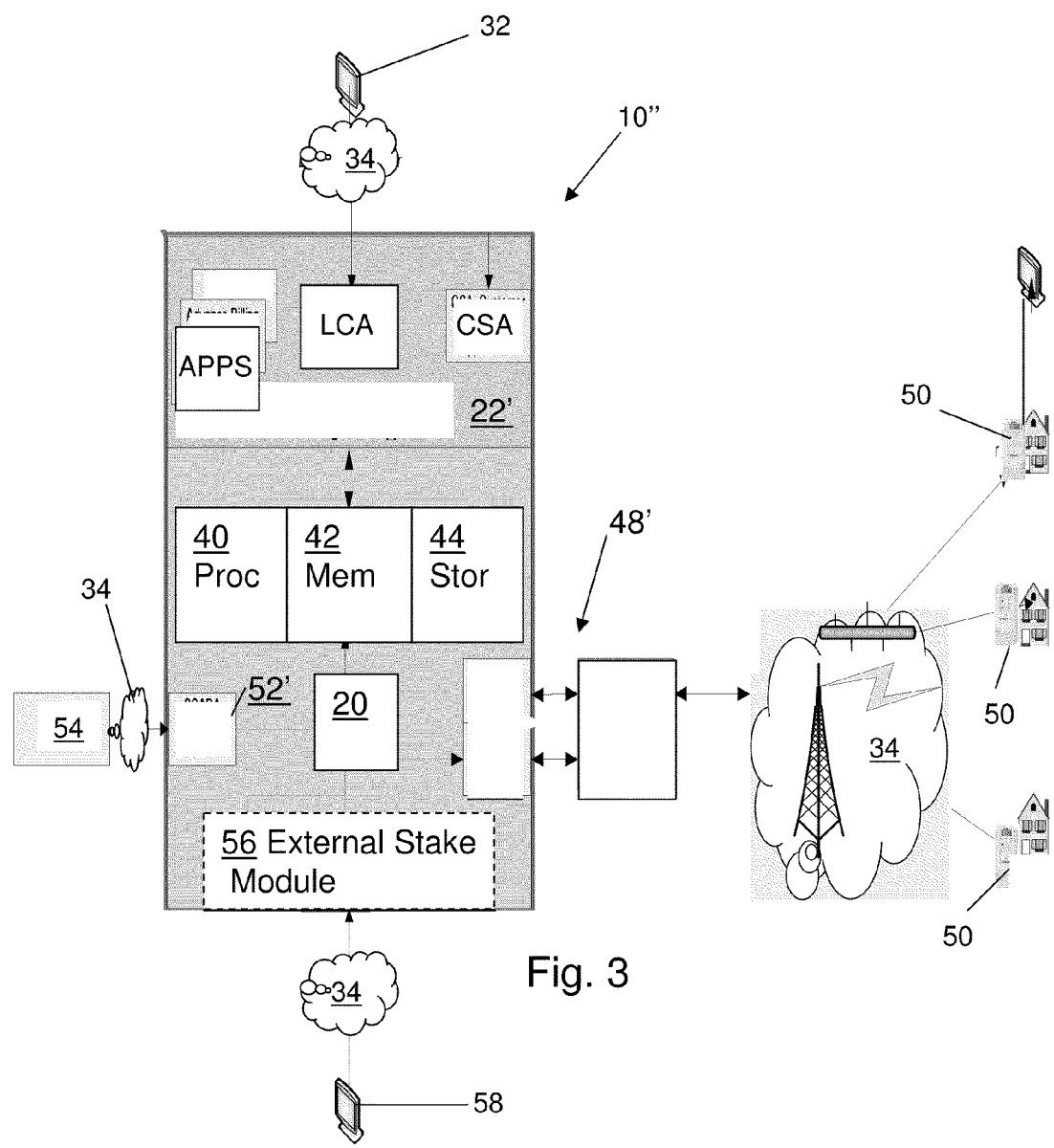
FIG. 3 is a block diagram of still another embodiment of the present invention, including another Smart Grid Platform.

Turning now to FIG. 3, an alternate embodiment of platform 10" is substantially similar to platform 10', but for the following distinctions. As shown, OT Module 52' is a SCADA Integration module, configured to integrate a SCADA 54 with a Load Curtailment Application running on Application Module 22'. Depending upon the type of SCADA, this module provides the capability to receive a SCADA message, authenticate it (e.g., using validation server and database 26, 27, FIG. 1), decipher it based upon "Bilateral tables" or other predefined protocol (e.g., using translation server and database 20, 24, FIG. 1) and ensure that appropriate security constraints (server/database 26, 27) are met prior to acting on the message. The Load Curtailment Application interprets the command and applies appropriate filters so that only those commands associated with load curtailment are implemented. In particular embodiments, the platform may be configured to operate and/or translate between any one of the following protocols:

IEC 61968/61970 & CIM: These families of standards define information exchanged among control center systems using common information models. They define application-level energy management system interfaces and messaging for distribution grid management in the utility space.

IEC 61850: This standard defines communications within transmission and distribution substations for automation and protection. It may be extended to cover communications beyond the substation to integration of distributed resources and between substations.

IEEE C37.118: This standard defines phasor measurement unit (PMU) performance specifications and communications.

MultiSpeak: Application software integration within the utility operations domain; a candidate for use in an Enterprise Service Bus.

openADR: The specification defines messages exchanged between utilities and commercial/industrial customers for price-responsive and direct load control.

eMIX: Exchange of price, characteristics, time, and related information for markets, including market makers, market participants, quote streams, premises automation, and devices.

Cyber Security:
   Security Profile for Advanced Metering Infrastructure, v 1.0, Advanced Security Acceleration Project—Smart Grid, Dec. 10, 2009: This document provides guidance and security controls to organizations developing or implementing AMI solutions. This includes the meter data management system (MDMS) up to and including the HAN interface of the smart meter.
   NERC CIP 002-009: Physical and cyber security standards for the bulk power system.
Meter Upgradability—PAP 00

Additionally, the platform has the flexibility within each module to be configured to support and integrate with substantially any other emerging or future-developed standard.

As also shown, Consumer-Side Module 48' is configured as an MAS and MDMS Integration Module, running in combination with an MAS/MDMS which may be located remotely from platform 10" as shown. The MDMS (Meter Data Management System) Integration module integrates the Load Curtailment Application with the MDMS. The Load Curtailment Application may receive data from the MDMS (e.g., using translation server/database 20, 24, FIG. 1) and is capable of sending commands to the MDMS based upon instructions by the Load Curtailment Application and its associated business logic.

The MAS (Metering Automation Server) collects data from various smart meters 50. Depending upon the type of MDMS and MAS either one may only need to be integrated with the Load Curtailment Application. The level of integration may thus be dependent upon the particular type of MAS and MDMS.

As shown, Application Module 22' is configured with other applications, such as CIS and GIS Integration Modules. The CIS module is configured to integrate the Load Curtailment Application with a user's Customer Information System (CIS), e.g., via network 34. This integration, for example, may permit utilities to connect their CIS systems to help automate customer billing. This integration with CIS may also enable the Load Curtailment Application to integrate the customer data with real time load usage & consumption AMI/AMR data from the MDMS/MAS of module 48' for real time demand management program capability.

The GIS Integration module integrates a user's GIS system with the Load Curtailment Application. This integration may integrate telemetry data with the curtailment programs providing easy visualization, such as via the Graphical User Interface of client machine 32, for demand management.

The Load Curtailment Application may also include other pre-built modules for logging, tracing, security, transactional integrity, compliance and other pre-defined components that may be leveraged in real time during operation of platform 10".

As also shown, the Application Module 22' may be configured to provide users with an LCA Control Manager, which may run on the user's client machine 32. The CM allows administration of the LCA application. An optional Customer Service Application may also be deployed on Module 22' to provide users, via client machine 32, with real time access to their energy usage. This may be provided over the network 34, such as via password protected access from a thin-client web browser or other client program 30 (FIG. 1) running on client machine 32. Other applications may include Advance Billing and Connect/Disconnect applications as discussed hereinabove.

It should be recognized that platforms 10, 10', 10" may be implemented using conventional tools configured in accordance with the teachings disclosed herein. For example, ODBC databases such as provided by Oracle and the SQL Server, development tools like Java and C++, Service Oriented Architecture tools like IBM WebSphere, Oracle Fusion, TIBCO active Matrix and others from major vendors and tool providers, may be used to build applications and provide various functionality described herein. The resulting embodiments as disclosed herein provide a unique configuration which is specific to the Energy industry. These embodiments may be leveraged by a great majority of the Energy clients thereby saving them design and development cost, as a set of ready modules that can be deployed with configuration and minimal development. Moreover, particular embodiments may include a platform which may be based upon open standards such as IEC 61968, IEC 61970, Common Information Model (CIM), XML, Service Oriented Architecture (SOA) and Web Services. Particular embodiments may also conform to NERC CIP 002-2 to 009-2 security standards and compliance requirements. Still further, embodiments of the platform are tool agnostic and will work with a user's current investment in SOA technology, databases, and infrastructure, while providing "Smart Transitioning" flexibility for future growth and modifications, as mentioned hereinabove.

Also, the use of SOA as described herein with respect to application modules 22, 22', in combination with the various APIs associated therewith, enable use of a wide range of third party applications in connection with platform 10, 10', 10". Indeed, the configuration of these embodiments, tends to enable non SOA developers to conveniently develop services and functionality usable with these platforms, with minimal need for knowledge of the underlying SOA technology. This enables users to leverage existing resources in their organization and leverage them for new Smart Grid Development activity.

Embodiments of the invention also enable the use of a wide range of potential Smart Grid Applications, which may be used in combination with smart appliances such as smart transformers and meters to achieve specific functional objectives. One such application in particular, namely, a Load Curtailment Application, has been described herein. However, those skilled in the art will recognize that this description was merely included as a non-limiting example, with the understanding that the breadth and depth of possible applications is essentially unlimited.

Figure 4:
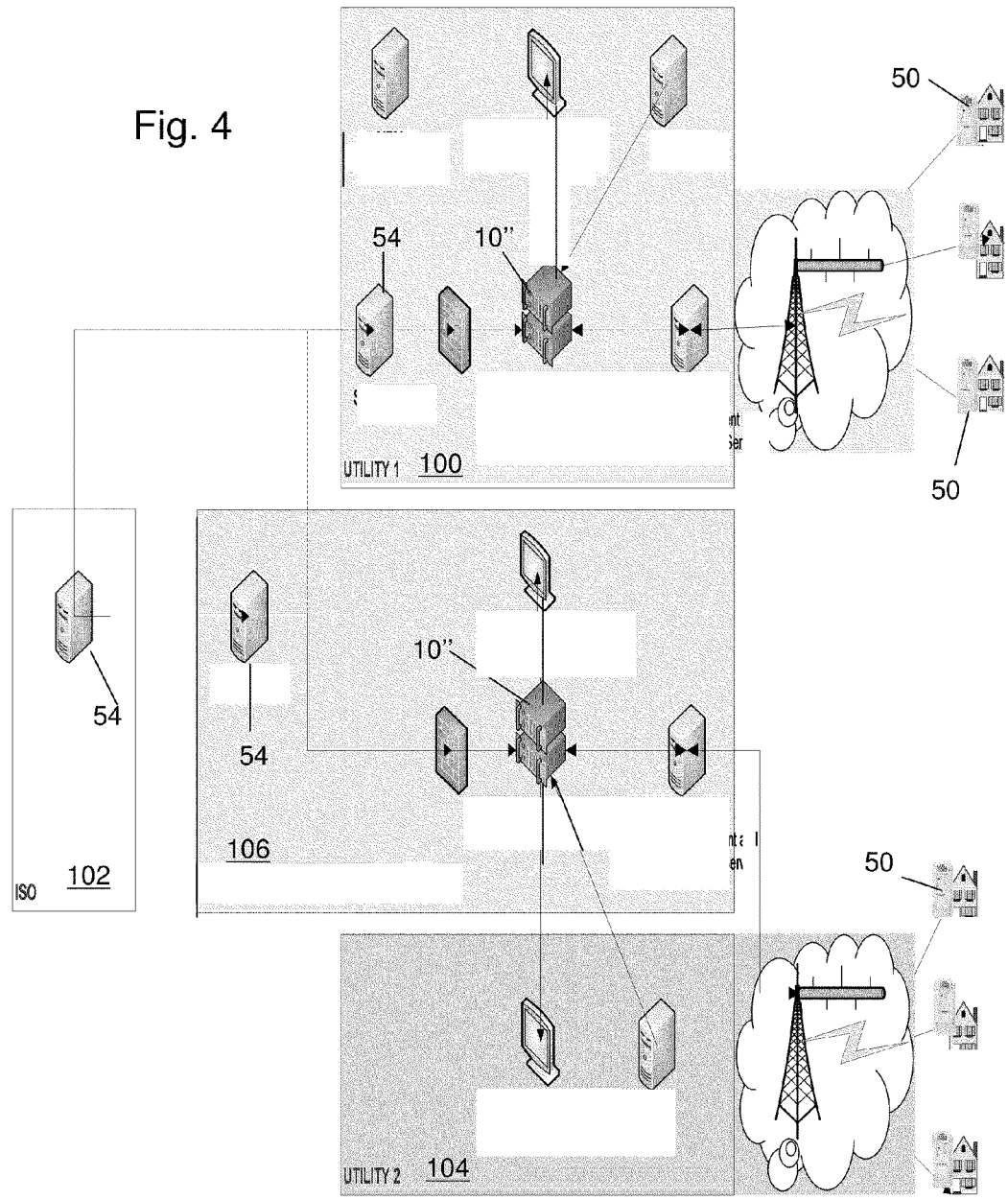
FIG. 4 is a block diagram of representative deployments of the Smart Grid Platform of FIGS. 1-3.

Referring now to FIG. 4, an example showing how the Smart Grid Platform may be deployed within a Smart Grid Network Topology, will be shown and described. For the purpose of explanation, FIG. 4 will be shown and described with respect to platforms 10" deployed for the purposed of implementing a Load Curtailment Application. It should be understood, however, that this description may be similarly applied to substantially any embodiment of the Smart Grid Platform shown and described herein, running substantially any application via its Application Module 22, 22'. The example of FIG. 4 illustrates how a load curtailment message from an ISO may be leveraged by utilities to trigger load curtailment at the retail/customer premises level. As shown, a relatively large utility 100, e.g., a utility large enough to justify having its own SCADA system 54, may deploy its own Smart Grid Platform 10" running a Load Curtailment Application. This Platform 10" may be coupled substantially and shown and described with respect to FIG. 3 hereinabove. In particular, this platform 10" may be connected to a local MDMS/MAS 48', which in turn is communicably coupled to retail Smart Meters 50. It is noted that the level of integration may depend upon the type of MDMS and the type of MAS used by the utility 100. Depending upon the MDMS, MAS and the architecture of each Utility, the MDMS or the MAS may be incorporated within, connected directly, or connected indirectly to the platform 10".

In operation, an ISO 102 may send a message (e.g., a load curtailment message in the ICCP protocol) from its SCADA 54 to the SCADA 54 at utility 100. At the utility 100, the message is passed to platform 10" where it is translated and passed to MDMM/MAS 48' and Smart Meters 50 to effect the desired operations (e.g., load curtailment).

As also shown, a relatively small utility 104, e.g., one which does not have its own full SCADA capability, may employ an intermediary 106 to host various functions such as a SCADA system 54 and/or a platform 10" on behalf of the utility 104. This hosted approach (which may also be referred to as a cloud computing approach, such as in the event communication is Internet based) enables the utility 104 to achieve the benefits of the platform 10" without installation and maintenance responsibilities. In this hosted model, as shown, the intermediary 106 may also provide hosted MDMS/MAS 48', e.g., to read and operate Smart Meters 50 at the customers of the utility 104. Alternative hosted approaches may also be used, such as in the event one or more of the foregoing components are deployed by the utility 104 itself. For example, the remotely hosted platform 10" may be configured to remotely control an MDMS/MAS 48' deployed by the utility 104.

In this hosted model, the SCADA at the ISO 104 may send a SCADA ICCP message to the SCADA 54 hosted by the Intermediary 106. The message is then passed to the hosted platform 10" for processing and control, via the (e.g., hosted) MDMS/MAS 48' for control of customer Smart Meters 50.

In either of these larger or smaller utility approaches, a SCADA message (e.g., of load curtailment) may be sent from the ISO 102 to a platform 10". By virtue of its integration with the MDMS/MAS, the platform 10" has knowledge of current energy demand and usage substantially in real time. Platform 10" may also be aware of customer information and optionally the GIS data based upon its integration with CIS and GIS systems respectively. At any given time, based upon the amount of energy load that needs to be curtailed, a predetermined set of business rules (logic) may be implemented, e.g., via Application Module 22' (FIG. 3) to curtail load on the Smart Meters 50 at the customer premises to achieve the desired reduction. Different levels of curtailment may be effected, e.g., based on prior customer agreement and/or incentives.

In addition, it should be recognized that substantially any participant in the energy chain, and/or third parties, may be provided with secure access to the platform, e.g., via client machine 32 of FIG. 1, to view a dashboard that provides real time information regarding current energy usage and cost, etc. This access, and the various platforms configured to provide this access, as discussed herein, may thus provide a unified and consistent view of information and data throughout the organization, to facilitate the development of new processes and capabilities such as load curtailment, self-healing, fault location detection and restoration, remote connect and disconnect, advance billing, time of usage and variable rate billing and other demand management programs. These embodiments may thus also provide the capability to optimally manage the supply and demand of power through real time integration of the energy value chain from the generation to consumer, as discussed hereinabove, for, e.g., higher grid reliability. These embodiments may further provide for leveraging real time integration of the aforementioned domains, participants and their applications, systems and data to harness market and price signals and integrate them with available real time data for delivering more value to consumers, such as in terms of variable rates, lower prices and greater reliability of electricity, water and gas, etc.

In addition to the foregoing, any of the embodiments disclosed herein may be provided with any of a variety of additional, optional characteristics. For example, any of the Smart Grid Platforms may be compliant with NERC CIP-002-2 though NERC CIP-009-2. Each SCADA message received may be authenticated. Bilateral tables, are the like, may be used to control access. In various embodiments, multiple platforms may be deployed in zones, e.g., each with maximum predetermined capacities of curtailment. Multiple platforms may also be used to provide geographic redundancy to ensure high availability, etc.

Figure 5:
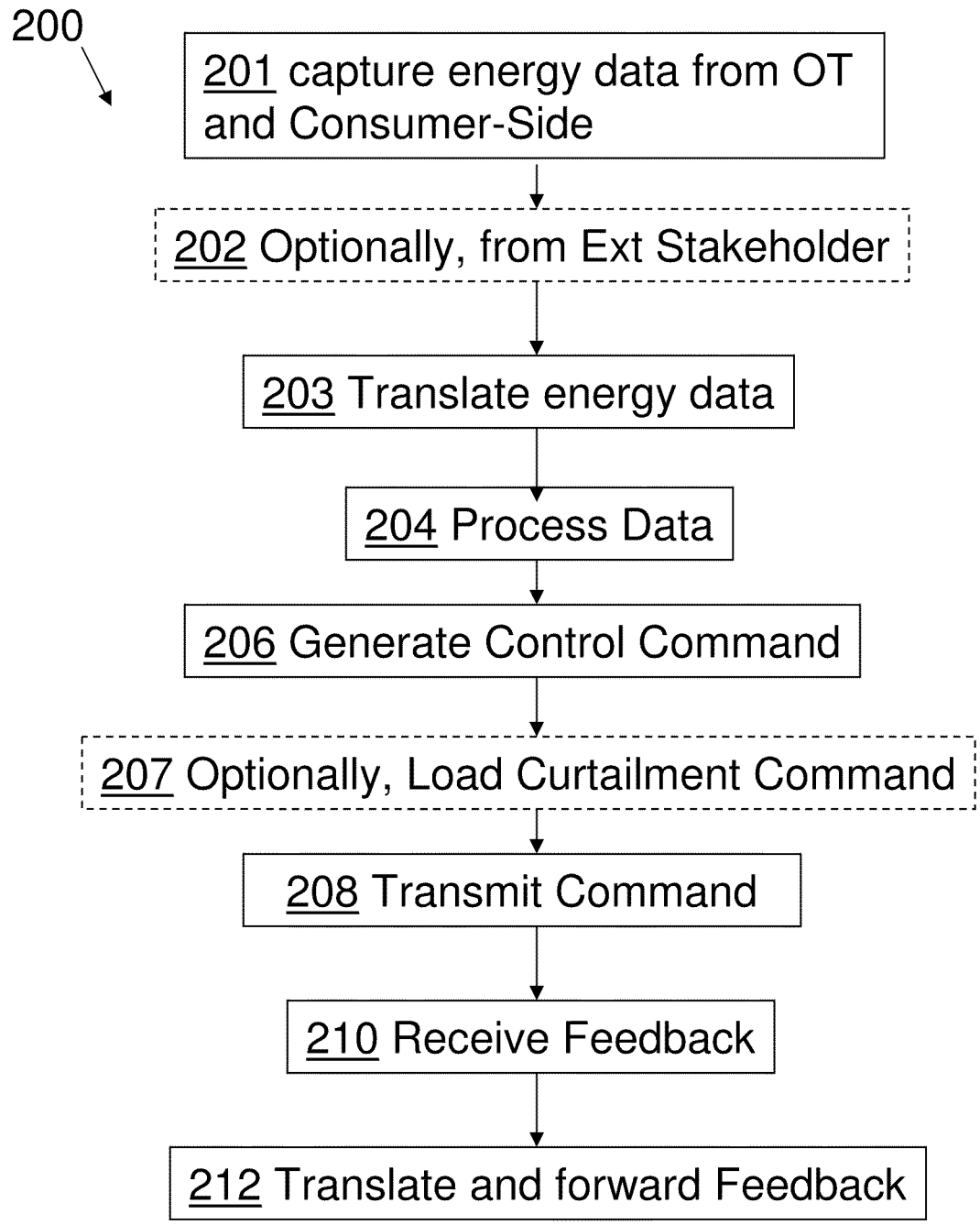
FIG. 5 is a flow chart of one embodiment of a method, with optional aspects shown in phantom, of using the Smart Grid Platform of FIGS. 1-4.

Having described various embodiments of the platform of the present invention, an exemplary method of operation 200 thereof will now be described in connection with FIG. 5. As shown at 201, the platform 10, 10', 10" uses OT and Consumer-Side modules 52, 48 to receive and capture energy data from OT and Consumer side Smart Grid devices substantially in real time. Optionally, at 202, the platform also uses an External Stakeholder module 56 to receive and capture energy data from an External Stakeholder. At 203, the platform translates the captured data, and at 204, actuates the application module 22 in combination with processor 40 to process the captured data. At 206, application module 22 and processor 40 generates a control command based on the processed data, and at 206, actuates translation module 20 to translate the control command into a protocol associated with the Consumer-Side module 48. Optionally, at 207, the control command is configured to be a load curtailment command. The Consumer-Side module 48 then transmits the translated control command at 208. At 210, the Consumer-Side module 48 receives a feedback communication from the Consumer-Side device. The feedback communication is translated 212 and forwarded to application module 22 for further processing substantially in real time.

It should be recognized that the foregoing method is merely illustrative, and that substantially any combination of data capture and command generation may be effected, such as determined by any number of applications being executed by application module 22, without departing from the scope of the present invention.

Figure 6:
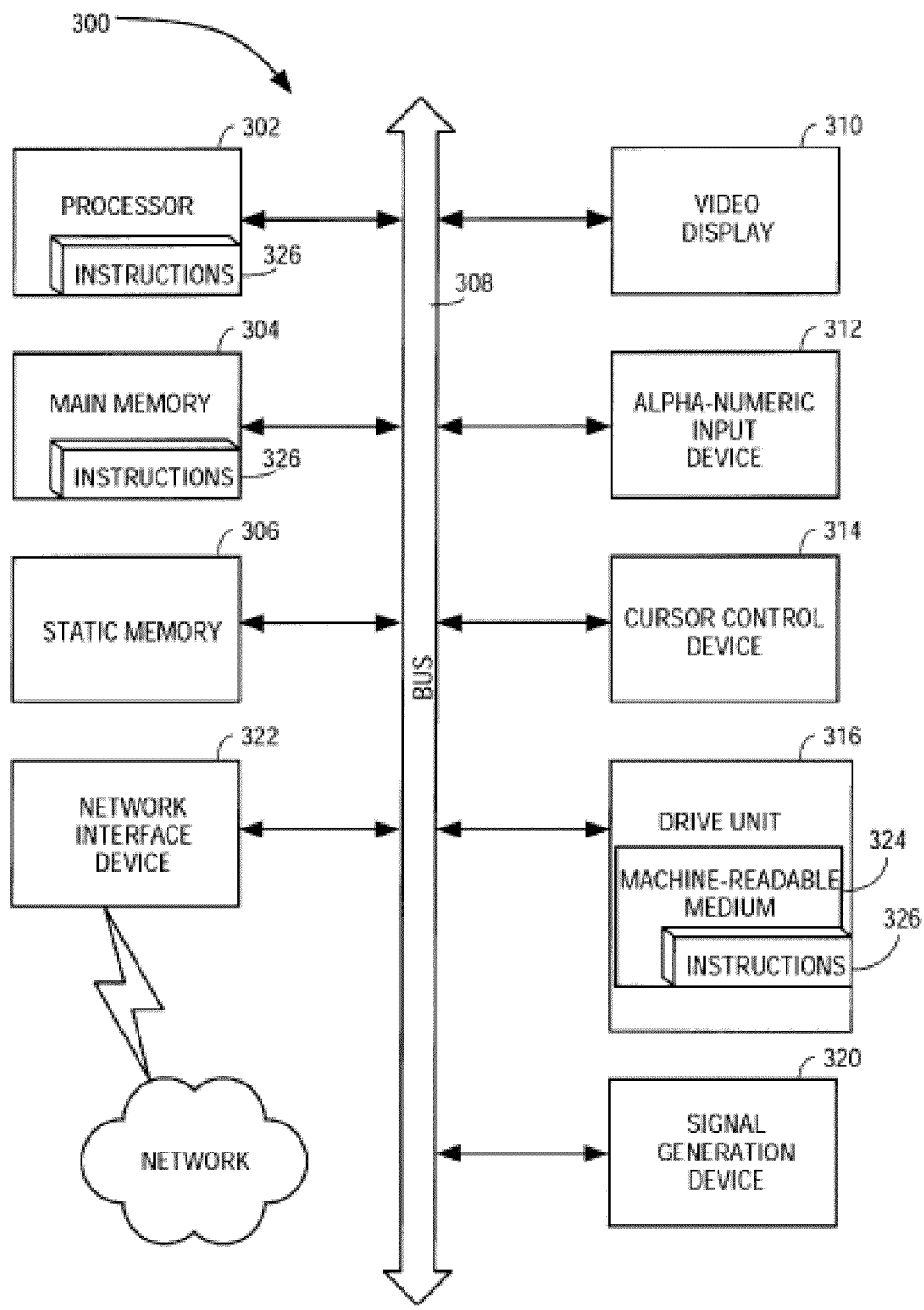
FIG. 6 is a block diagram of one embodiment of a computer system usable in any of the various embodiments of the present invention.

FIG. 6 shows a diagrammatic representation of a machine in the exemplary form of a computer system 300 which may be used in connection with substantially any of the smart devices discussed herein, including the client machine, EMS system, Smart Meters, Platforms, etc., within which a set of instructions, for causing the machine to perform any one of the methodologies discussed above, may be executed. In various embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Thus, an apparatus and method for a Smart Grid Platform have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Furthermore, embodiments of the present invention include a computer program code-based product, which includes a computer readable storage medium having program code stored therein which can be used to instruct a computer to perform any of the functions, methods and/or modules associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Having thus described the invention, what is claimed is:

1. A computer-implemented platform server for energy management operations in a Smart Grid environment, the platform server comprising:
    a server including a processor, memory, and computer readable media;
    an application module communicably coupled to the server, configured to enable operation of any of a plurality of Smart Grid Applications;
    a consumer-side module communicably coupled to the server, and configured for bi-directional communication with a plurality of consumer-side intelligent appliances;
    an Operations Technology (OT) module communicably coupled to the server, and configured for communication with an electrical grid Energy Management System (EMS); and
    a translation module coupled to, and configured to translate data received from, said application, consumer-side, and OT modules;
    wherein the platform is configured to selectively receive, translate, and transmit data from and among any of said application, consumer-side, and OT modules, to facilitate automated energy management operations in a Smart Grid environment;
    further comprising an external stakeholder module communicably coupled to the server, and configured for bi-directional communication with one or more remotely located Smart Grid Stakeholders;
    wherein the external Smart Grid Stakeholders include internal energy supply chain participants and external energy supply chain participants; and
    wherein the internal energy supply chain participants are selected from the group consisting of ISOs, Power Generation entities, Power Transmission entities, Utility Operators, and combinations thereof.

2. The platform server of claim 1, wherein the application module includes at least one Application Programming Interface (API) configured to enable integration with any of a plurality of the Smart Grid Applications.

3. The platform server of claim 1, wherein the translation module is configured to translate a protocol selected from the group consisting of: IEC 61968; IEC 61970; CIM; IEC 61850; IEEE C37.118; MultiSpeak; openADR; eMIX; Security Profile for Advanced Metering Infrastructure, v 1.0, Advanced Security Acceleration Project—Smart Grid, Dec. 10, 2009; NERC CIP 002-009; PAP 00; ICCP; and combinations thereof.

4. The platform server of claim 1, further comprising at least one of the Smart Grid Applications, the at least one of the Smart Grid Applications being configured to interpret and process the data.

5. The platform server of claim 4, wherein the translation module is configured to operate using a CIM (Common Information Model) standard.

6. The platform server of claim 1, being configured to provide automated communication between Utilities via the OT module, and Smart Grid Stakeholders via the external stakeholder module.

7. The platform server of claim 1, wherein the external energy supply chain participants include financial energy market participants.

8. The platform of claim 7, wherein the internal and external energy supply chain participants are selected from domains within group consisting of a Generation domain, Transmission domain, Distribution domain, Market domain, Operations domain, Service Provider domain, Customer domain, and combinations thereof.

9. The platform server of claim 7, being configured to provide end-to-end automated integration across an energy value chain extending from power generation to power transmission to power consumer.

10. The platform server of claim 9, configured for being deployed at substantially any point in the energy value chain.

11. The platform server of claim 1, wherein the application module is configured as a Service Oriented Architecture (SOA) module.

12. The platform server of claim 11, wherein the SOA module is configured to enable individual Smart Grid Applications to be selectively integrated with, and dis-integrated from, the server independently of other ones of the Smart Grid Applications.

13. The platform server of claim 12, wherein the SOA module is configured to enable interoperability of a plurality of Smart Grid Applications each having business logic associated with Smart Grid operation.

14. The platform server of claim 11, wherein the SOA module is configured to enable integration of Smart Grid Applications selected from the group consisting of Outage Management Systems (OMS), Interactive Voice Response (IVR) systems, Customer Information Systems (CIS); Workforce Management Systems (WMS), Self Healing Systems, demand-based connect/disconnect and load curtailment, AMI/AMR (Advanced Metering Infrastructure/Automated Meter Reading), GIS (Geographic Information System), and combinations thereof.

15. The platform server of claim 14, wherein the SOA module is configured to enable integration of Smart Grid Applications, while conforming to security and safety standards, substantially in real time, using real time load information received via the consumer-side module.

16. The platform server of claim 14, wherein the SOA module is configured with Loosely Coupled Architecture (LCA).

17. The platform server of claim 1, wherein the consumer-side intelligent appliances include smart meters.

18. The platform server of claim 17, wherein the consumer-side module is configured to communicate data regarding meter reading and Meter Control Commands.

19. The platform server of claim 1, wherein the EMS (Energy Management Systems) comprises a SCADA system.

20. The platform server of claim 19, being configured to integrate an EMS system via said OT module, with IT systems via at least one of the application and consumer-side modules.

21. The platform server of claim 1, being platform independent.

22. The platform server of claim 21, being deployable on a local user's infrastructure.

23. The platform server of claim 22, being deployable remotely in a cloud computing, Software as a Service (SaaS) environment.

24. The platform server of claim 1, configured to generate a graphical user interface accessible by a networked client machine, to facilitate user-interaction with the platform.

25. A computer-implemented method for energy management operations in a Smart Grid environment, method comprising:
(a) with the platform server of claim 1, using the OT and Consumer-Side modules to receive and capture energy data from OT and Consumer side devices substantially in real time, including using an External Stakeholder module to receive and capture energy data from an External Stakeholder, wherein the external Smart Grid Stakeholders include internal energy supply chain participants and external energy supply chain participants, and wherein the internal energy supply chain participants are selected from the group consisting of ISOs, Power Generation entities, Power Transmission entities, Utility Operators, and combinations thereof;
(b) translating, with the platform, the captured data;
(c) actuating, with the platform, the application module to process the captured data;
(d) generating, with the application module, a control command based on the processed data;
(e) translating the control command into a protocol associated with the Consumer-Side module;
(f) transmitting the translated control command to the Consumer-Side device;
(g) receiving, at the platform, a feedback communication from the Consumer-Side device;
(h) translating the feedback communication; and
(i) forwarding the translated feedback communication to the application module for further processing substantially in real time.

26. The method of claim 25, wherein at least one of said translating (b), (e) and (h) is effected using a protocol selected from the group consisting of: IEC 61968; IEC 61970; CIM; IEC 61850; IEEE C37.118; MultiSpeak; openADR; eMIX; Security Profile for Advanced Metering Infrastructure, v 1.0, Advanced Security Acceleration Project—Smart Grid, Dec. 10, 2009; NERC CIP 002-009 PAP 00; ICCP; and combinations thereof.

27. The method of claim 25, wherein said generating (d) comprises generating a load curtailment control command based on the processed data.

28. An article of manufacture for energy management operations in a Smart Grid environment, said article of manufacture comprising:
a non-transitory computer usable medium having a computer readable program code embodied therein, said computer readable program code configured for;
(a) implementing Operations Technology (OT) and Consumer-Side modules to receive and capture energy data from OT and Consumer side devices substantially in real time, including using an External Stakeholder module to receive and capture energy data from an External Stakeholder, wherein the external Smart Grid Stakeholders include internal energy supply chain participants and external energy supply chain participants, and wherein the internal energy supply chain participants are selected from the group consisting of ISOs, Power Generation entities, Power Transmission entities, Utility Operators, and combinations thereof;
(b) translating the captured data;
(c) processing the captured data;
(d) generating a control command based on the processed data;
(e) translating the control command into a protocol associated with the Consumer-Side module;
(f) transmitting the translated control command to the Consumer-Side device;
(q) receiving a feedback communication from the Consumer-Side device;
(h) translating the feedback communication; and
(i) forwarding the translated feedback communication to the application module for further processing substantially in real time.

* * * * *